Jan. 14, 1947.   T. F. McCARTHY   2,414,412
SCRAPER LOADER APPARATUS
Filed Dec. 14, 1944   3 Sheets-Sheet 3
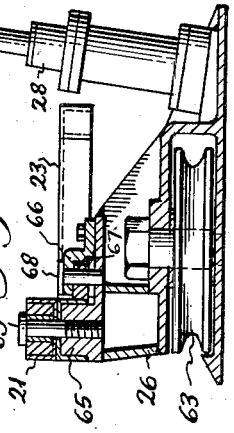
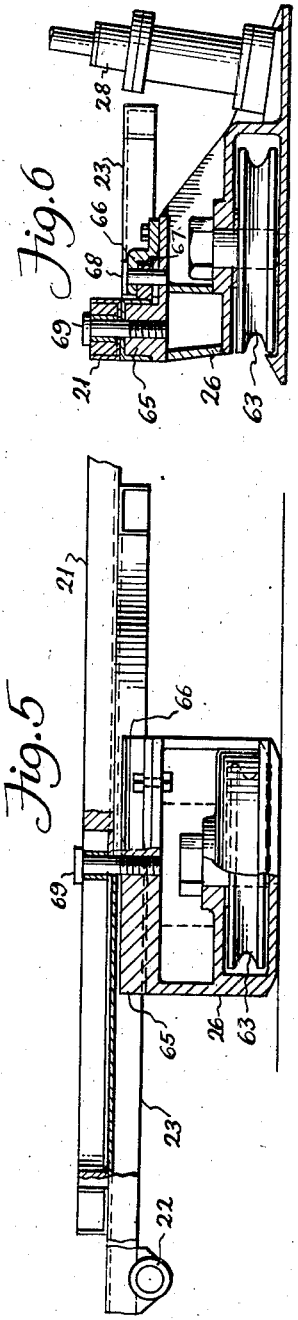
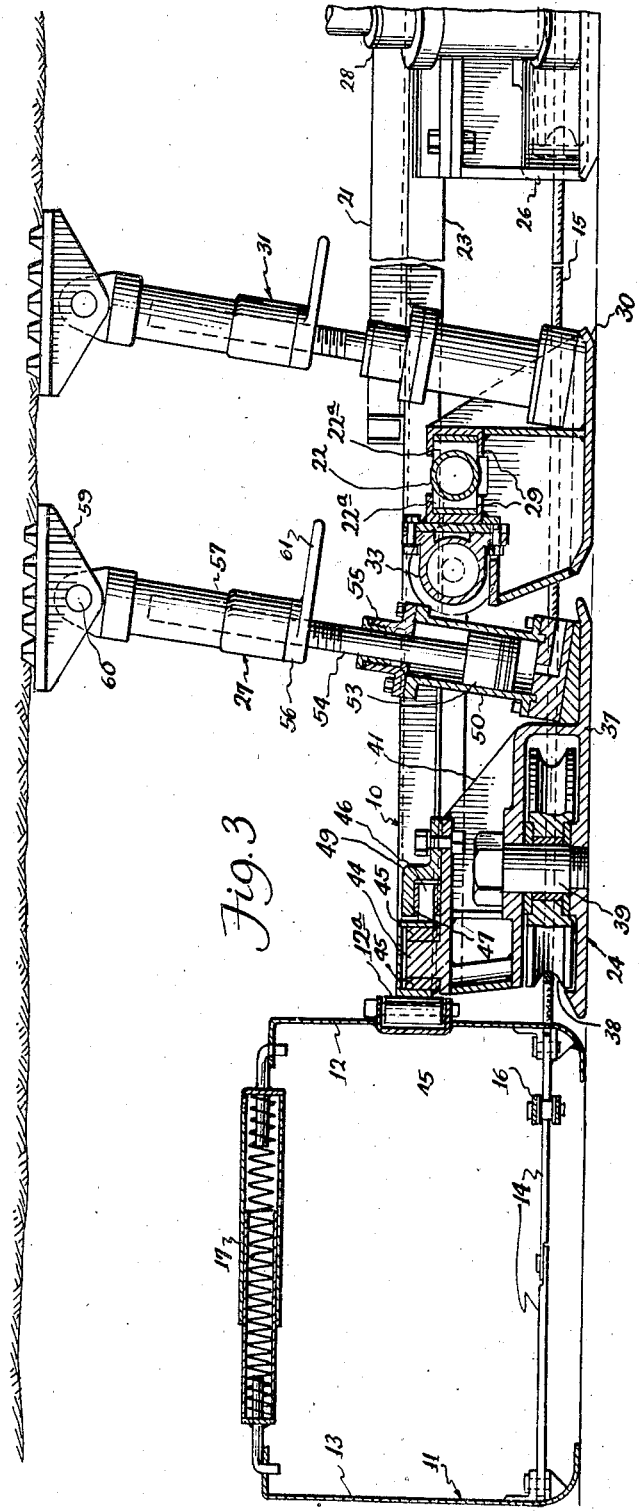
INVENTOR
Timothy F. McCarthy
Clarence F. Poole
ATTORNEY Patented Jan. 14, 1947

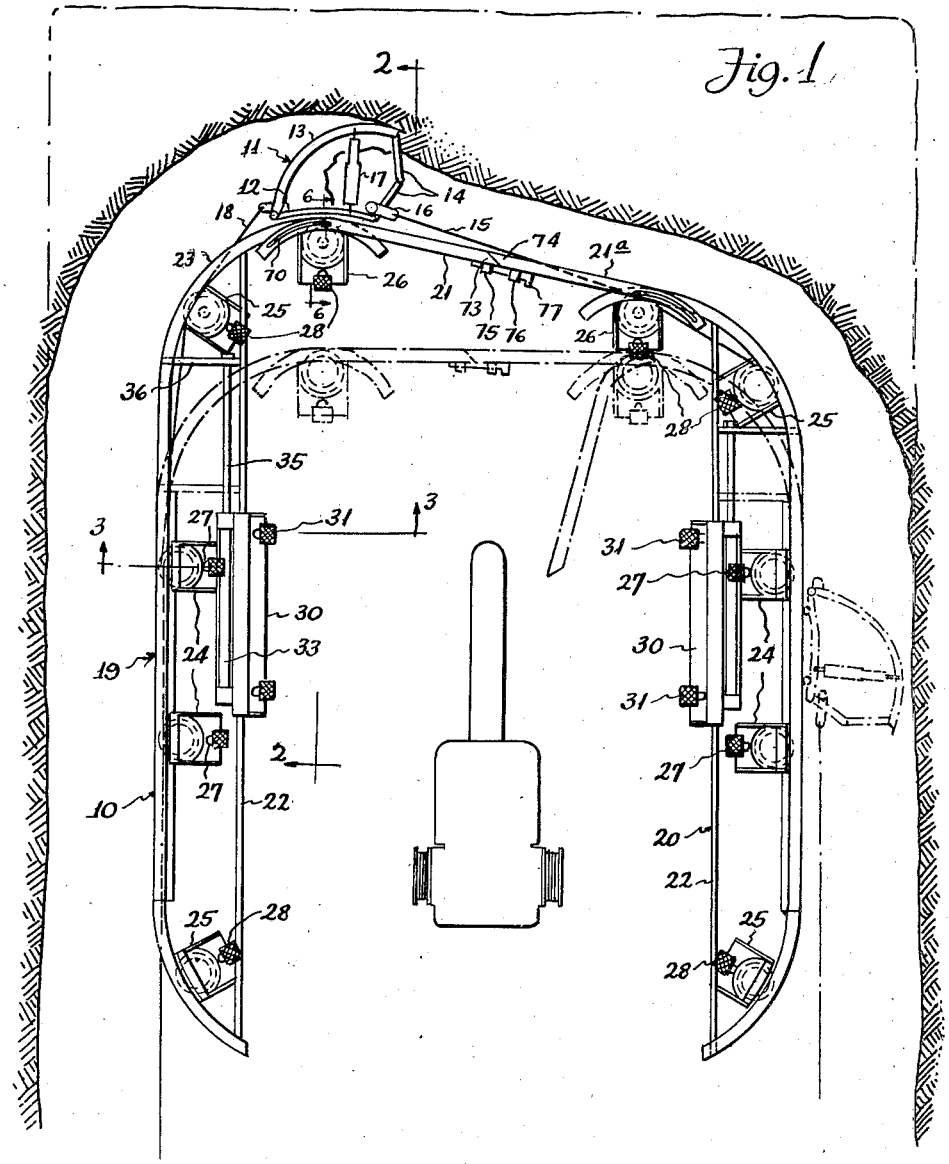

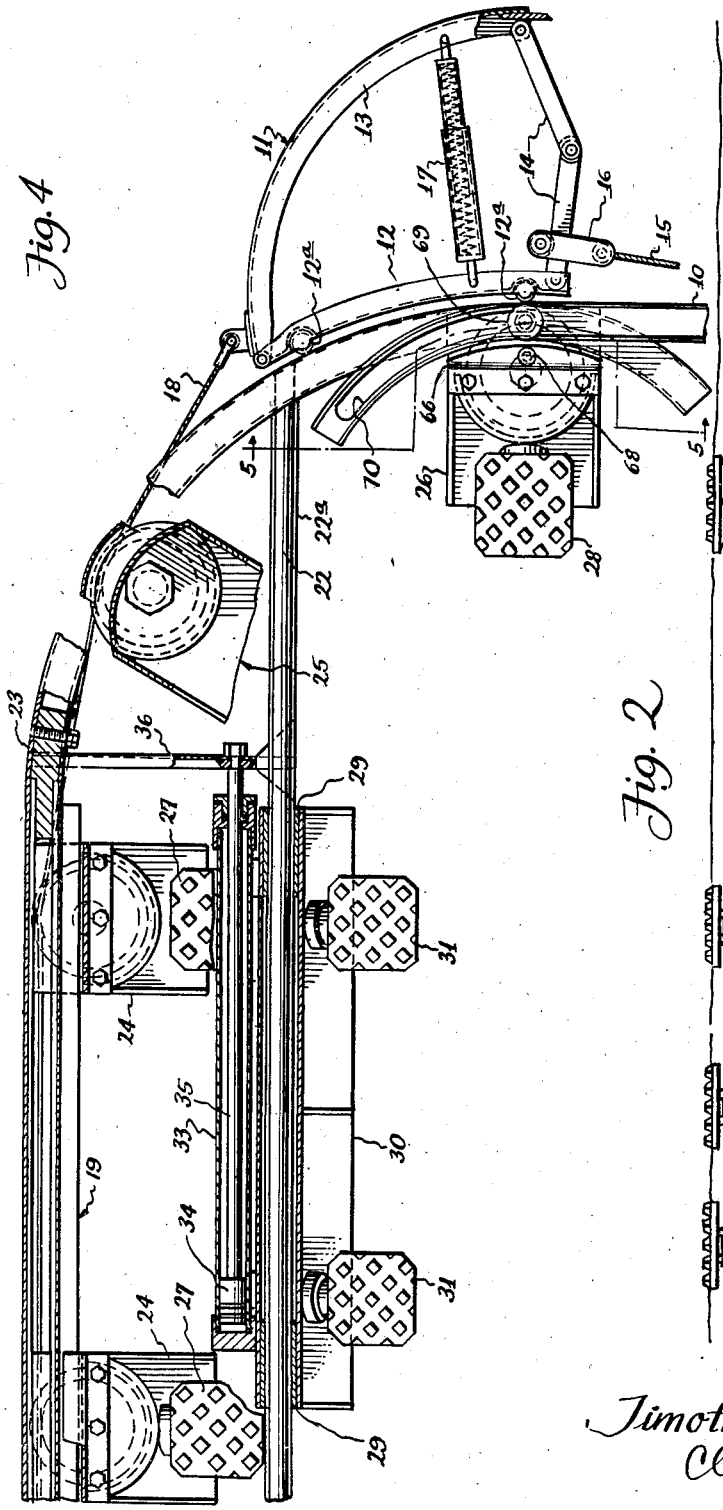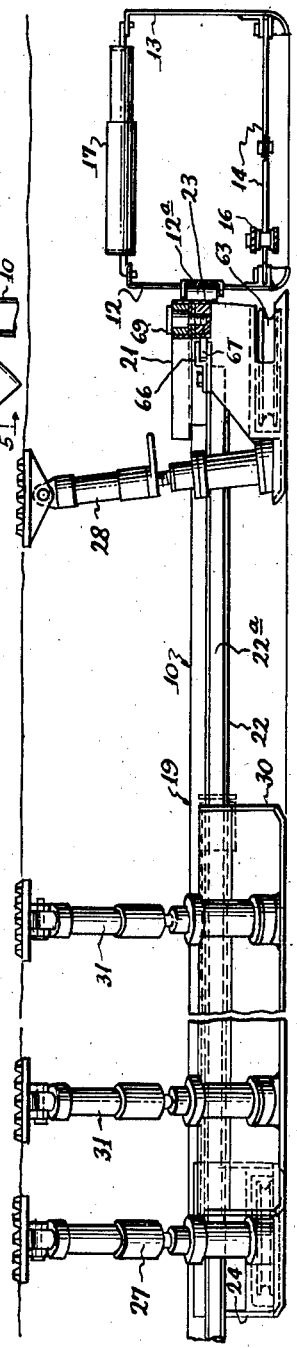

2,414,412

UNITED STATES PATENT OFFICE 2,414,412

SCRAPER LOADER APPARATUS

Timothy F. McCarthy, Indiana, Pa.

Application December 14, 1944, Serial No. 568,119

16 Claims. (Cl. 37—115)

This invention relates to improvements in scraper loader apparatus for handling loose material in mines, and more particularly relates to an improved head frame for guiding a scraper for picking up loose material from a relatively long face in a coal mine.

Scraper loader apparatus utilizing head frames to turn the scoop at the working face of a mine have heretofore been used for picking up loose material such as coal from the working face, and for transporting it to the entry where it is loaded onto cars. The head frames utilized, however, have only been suitable for use in narrow working places, such as mine entries, and it has been impractical to adapt them to guide the scraper for loading from a long face due to the fact that they are only adapted to reverse the direction of travel of the scraper at the coal face and must be moved laterally from time to time in order to load out the entire working place. This is impractical because the time consumed in moving the head frame from time to time, to advance the loading operation across the working face until the entire face is loaded out, cuts down the loading rate to a point where the advantage of loading mechanically is lost.

Among the objects of my invention are to provide a new and improved form of head frame for a scraper loader of a simplified and efficient construction, and so arranged as to guide the scraper to load material from relatively wide working faces, and also capable of varying the angle of travel of the scraper with respect to the working face.

A more specific object of my invention is to provide a novel and improved form of sectional head frame for a scraper loader which may readily be moved from one working place to another in sections, and which includes two independent side guiding members for guiding the scraper into and away from the working place, and guide means detachably connecting these side guiding members together at their forward ends and forming a guide and reaction means for guiding the scraper across the working face, either one of which side guiding members may be advanced to advance the scraper into the loose material during the loading operation and to vary the angle of the forward guide means with respect to the working face, to maintain the scraper in such relation with respect to the loose material in the working place as to efficiently pick up the loose material therefrom.

These and other objects of my invention will appear from time to time as the following specification proceeds and with reference to the accompanying drawings wherein:

Figure 1 is a plan view of a material handling apparatus constructed in accordance with my invention, showing the apparatus in position for loading from a mine room;

Figure 2 is a fragmentary longitudinal sectional view taken substantially along line 2—2 of Figure 1;

Figure 3 is an enlarged fragmentary transverse sectional view of the loading apparatus taken substantially along line 3—3 of Figure 1, but showing the scoop in transverse section and in a different position along the head frame than in Figure 1;

Figure 4 is an enlarged fragmentary detail plan view of the loading apparatus with certain parts thereof shown in substantially horizontal section;

Figure 5 is an enlarged detail sectional view taken substantially along line 5—5 of Figure 4; and Figure 6 is a detail sectional view taken substantially along line 6—6 of Figure 1.

In the embodiment of my invention illustrated in the drawings, a head frame 10 is shown as being positioned adjacent a working face of a mine room for guiding a scraper 11 into and across the working face, to pick up mined material, such as coal, therefrom.

The scraper 11 is herein shown as being a hinge type scraper with an inner side wall 12 substantially conforming to the curved form of the head frame 10 and having an outwardly and forwardly curved outer side wall 13 pivotally connected to the rear end of said inner side wall. Said side walls are connected together at their forward ends by means of a pair of toggle links 14, 14 pivotally connected to the inner sides of said side walls adjacent the lower ends thereof and pivotally connected together at their inner ends. A head rope 15 is connected to said toggle links for slidable movement therealong by means of a connecting member 16, which is slidably movable along said links. A yieldable member 17 is connected between the upper ends of said side walls, and urges said side walls in an outward direction against the pull of the head rope on the toggle links 14, 14, to yieldably hold said side walls in spaced apart relation with respect to each other. A tail rope 18 is connected to the rear end of the outer side wall 13 of said scraper, and serves to move said scraper in a reverse direction to position it to obtain a new bite on the material it is desired to load, and to form a reaction means for the scraper as it travels about said head frame, to hold said scraper in the proper relation with respect to said head frame. Rollers 12a, 12a are mounted in the inner side wall 12 and engage the head frame 10 during travel thereabout, to reduce the friction between said scraper and said head frame.

The head frame 10 includes a side frame member 19 extending along one rib of the working place, a side frame member 20 extending along the opposite rib of the working place, and guide rails 21 and 21a adjustably connected with said side frame members 19 and 20, respectively, to form a means for guiding the scraper from one side frame member to the other, for picking up loose material from the working face, while reacting against said guide rails.

The side frame members 19 and 20 are of the same construction except the side frame member 19 is arranged to extend along the left rib of the working place and the side frame member 20 is arranged to extend along the right rib of the working place, so one of said side frame members only will be described in detail herein, and the same part numbers will be applied to similar parts of each of said side frame members.

The side frame member 19 includes a guide member 22 herein shown as being a longitudinally extending tube having guide bars 22a, 22a extending along opposite sides thereof and suitably secured thereto, as by welding. Said guide member is connected at its forward end to the inwardly curved advance or inby end of a guide rail 23 extending along the outer side of said side frame member and forming a reaction and guide means for the scraper 11 as it moves therealong. Said guide member is connected at its rear end to an inwardly curved rear or outby portion of said guide rail, which portion serves to guide the scraper onto said side frame. Said guide rail is adapted to be engaged by the rollers 12a, 12a of the scraper 11 and is formed from a channel positioned so its flanges face the ground. Two spaced stationary bases 24, 24 are provided to slidably support said guide rail above the ground. Said guide rail is also supported adjacent its ends on a plurality of bases 25, 25 and 26, which move with said guide rail upon movement thereof. Jacks 27, 27 are connected with each of said stationary bases 24, 24, to hold said bases in a stationary position on the ground during the loading operation. In a similar manner, jacks 28, 28 are provided to hold said movable bases in position on the ground during loading.

The guide bars 22a, 22a of the guide member 22 are slidably guided in two pairs of longitudinally spaced facing channelled guides 29, 29, mounted on a stationary base 30. Said base is held in a stationary position with respect to the ground by means of jacks 31, 31, adapted to be interposed between the bottom plate of said base and the mine roof, and similar to the jacks 27, 27.

A fluid cylinder 33 is mounted at its ends on the base 30 and extends longitudinally along said base, above the bottom thereof. A piston 34 movable within said cylinder has a piston rod 35 extending therefrom. Said piston rod is connected at its forward end to a cross bar 36 which is connected between the guide member 22 and the guide rail 23. The admission of fluid under pressure to either the head or piston rod ends of said cylinder thus serves to move said guide rail and side frame with respect to said stationary bases 24, 24 and 30 towards or from the working face, in an obvious manner.

The bases 24, 24 each form a stationary guide for the guide rail 23, and include a ground engaging bottom plate 37 having a sheave 38 mounted just above said bottom plate on a vertical pin 39 (see Figures 3 and 4). Said sheave is provided with a relatively deep throat, and the advance edge of the bottom plate 37 is inclined upwardly from the ground to the lower outer edge of the throat of said sheave, to guide the cable to said throat when tension on either the head or tail rope is taken up. Said base also includes a support portion 41 which extends upwardly from said bottom plate and which is herein shown as being formed integral therewith, and which has a tongue 44 projecting upwardly from its upper edge. Bearing members 45, 45 extend along opposite sides of said tongue (see Figure 3). Said bearing members are adapted to engage the insides of the flanges of the guide rail 23. An outer surface 42 of said support portion 41 of said base 24 is inclined downwardly and inwardly from a point just beneath the tongue 44 to the upper edge of the sheave 38, to deflect and guide the cable into the throat of said sheave.

A retaining gib 46 is secured to and extends inwardly from the lower inner side of the guide rail 23, between two vertically spaced bearing members 47, 47. The lower bearing member 47 is mounted on the upper side of the support portion 41, while the upper bearing member is mounted on the underside of a guide clip 49 mounted on the top surface of said support and guide portion of said base, to retain said guide rail on said base and to form a slidable guide therefor.

The jacks 27, 27 for holding the bases 24, 24 stationary during operation of the scraper, are herein shown as being fluid pressure operated jacks (see Figure 3). Each of said jacks includes a cylinder 50 mounted on the inner upper side of the bottom plate 37 at its head end and having a piston 53 movable therealong. A piston rod 54 extends upwardly from said piston and through a suitable packing gland 55 mounted on the piston rod end of said cylinder. The upper end of said piston rod is threaded and has a nut 56 threaded thereon, which abuts the undersurface of a cylinder 57 slidably mounted on the upper end of said piston rod. A roof-engaging shoe 59 is transversely pivoted on the upper end of said cylinder on a pivotal pin 60. A hand lever 61 is herein shown as being provided to operate said nut, so said nut may readily be turned by hand to position said roof-engaging shoe into proximity with the mine roof. Said hand lever is herein shown as being formed integral with said nut, but a well known form of ratchet connection may be provided between said hand lever and said nut, if desired. When said roof-engaging shoe is moved close to the mine roof, fluid under pressure may be admitted to the head end of said cylinder to positively engage said shoe with the mine roof and to hold said shoe in engagement therewith.

The bases 25, 25 are each of a similar construction and are similar to the bases 24, 24 except that they have the curved portions of the guide rail 23 suitably secured to their upper ends, so they will move with said guide rails upon movement thereof, so will not be described in detail herein.

The base 26 is likewise similar in construction to the bases 24, 24 and 25, 25 (see Figures 5 and 6). Said base has a guide sheave 63 mounted in its lower end in a manner similar to which the guide sheave 38 is mounted in the base 24, and has an upwardly projecting tongue 65 adapted to extend between the downwardly facing flanges of the guide rail 23. A clip 66 secured to the upper side of said base extends over a gib 67, which is secured to and extends inwardly from said guide rail. A pin 68 extends through said clip and gib, to secure said gib to said base. A threaded pin 69 extends through the top of said guide rail 23 and is threaded in the tongue 65 and projects upwardly therefrom. The guide rail 21 has an inwardly curved advance end having a curved slot 70 extending therealong through which the pin 69 is adapted to extend, to form a slidable guide for said guide rail and also to permit pivotal movement of said guide rail with respect to said base so the curved advance portion of said guide rail may form a continuation of the curved forward end of the guide rail 23 in all positions of said guide rails with respect to each other.

The guide rail 21 has a beveled inner end 73 which is adapted to abut a beveled inner end 74 of the guide rail 21a. Straps 75, 76 extend inwardly from the inner sides of said guide rails 21 and 21a, respectively, and are adapted to have a wedge-shaped key 77 extend therethrough, for securing said guide rails together, so said guide rails may form a guide and reaction means along which the scraper may travel during the loading operation.

The side frames 19 and 20 may thus be moved independently of each other when the guide rails 21 and 21a are connected together, and either one of said guide rails may be pivoted inwardly along its associated side frame when disconnected from the opposite guide rail, to provide an opening in said frame to permit a kerf-cutting machine to be stored in the space between said side frames after the cutting operation has been completed and during the loading operation, as is shown in Figure 1, and to permit said side frames to be separately moved about the mine.

The fluide pressure system for supplying fluid under pressure to the jacks 27, 27, 28, 28 and 31, as well as to the head and piston rod ends of the fluid cylinders 33, 33, to advance or retract the respective side frame members, may be of any well known form, and the valves for controlling the admission and release of fluid under pressure to said valves and cylinders may be positioned remote from said head frame, if desired. Said fluid pressure system and valves are not herein shown or described since they form no part of my present invention.

During operation of the loading apparatus, the side frame members 19 and 20 are positioned along opposite ribs of the working place, and the forward or advance ends thereof are connected together by connecting the guide rails 21 and 21a together at their abutting ends by means of the key 77. The jacks 31, 31, 27, 27 and 28, 28 are then engaged with the mine roof to hold the bases 30, 30, 24, 24, 25, 25 and 26, 26 in position on the ground. The guide rails 21 and 21a may first be positioned parallel to the working face, for loading out the loose coal by the scraper 11. The left-hand guide frame may then be advanced during loading by releasing the jacks holding the bases 25, 25 and 26 in position and supplying fluid under pressure to the head end of the cylinder 33. This will position the head frame to guide the scraper 11 to load out the coal from the left-hand corner of the working place, as shown in Figure 1. It should here be understood that the advancing operation of the left-hand guide frame is a progressive step by step operation until the entire left-hand corner of the working place has been loaded out, and that the bases 25, 25 and 26 are held in a stationary position during actual loading. The right-hand guide frame may then be progressively advanced like the left-hand guide frame, to load out the central part and right-hand corner of the working place.

Where it is desired that the apparatus operate to load along faces of different lengths, longer or shorter guide rails interchangeable with the guide rails 21, 21a may be provided, or additional sectional guide rails (not shown) may be connected between the ends of the guide rails 21, 21a.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a scraper loader apparatus and in combination with a scraper having head and tail ropes for propelling the same, means for positively guiding said scraper for travel along a coal face including a sectional head frame including two side frame members each of which is adjustable independently of the other, and a guide rail pivotally connected to the forward end of each of said side frame members, to guide the scoop for travel in the desired path with respect to the coal face.

2. In a scraper loader apparatus and in combination with a scraper having head and tail ropes for propelling the same, means for positively guiding said scraper for travel along a coal face including a sectional head frame including two side frame members each of which is adjustable independently of the other, a guide rail adjustably connected to the forward end of each of said side frame members, to guide the scoop for travel in the desired path with respect to the coal face, and means for holding said head frame in a stationary position during the loading operation.

3. In a scraper loader apparatus and in combination with a scraper having head and tail ropes for propelling the same, means for positively guiding said scraper for travel along a coal face including a sectional head frame including two side frame members each of which is adjustable independently of the other, and a guide rail adjustably connected to the forward end of each of said side frame members, to guide the scoop for travel in the desired path with respect to the coal face, and means for detachably connecting said guide rails together.

4. In a scraper loader apparatus and in combination with a scraper having head and tail ropes for propelling the same, means for positively guiding said scraper for travel along a coal face including a sectional head frame including two side frame members each of which is adjustable independently of the other, and a guide rail pivotally connected to the forward end of each of said side frame members, for connecting said guide frames together and for guiding the scoop for travel in the desired path along the coal face.

5. In a head frame for guiding a scraper for picking up loose material from a mine face, two spaced side frame members, each of said side frame members having a guide rail extending therealong and being adapted to guide the scraper for movement along opposite ribs of the working place, and means connecting said side frame members together at their forward ends and forming a means for guiding the scraper across the working place from one of said side frame members to the other, said means being connected to said side frame members in such a manner as to permit said side frame members to be advanced towards the working place independently of each other, and forming a means for guiding the scraper across the working place for picking up loose material therefrom.

6. In a head frame for guiding a scraper for picking up loose material from a mine face, two spaced side frame members, each of said side frame members having a guide rail extending therealong and being adapted to guide the scraper for movement along opposite ribs of the working place, and means connecting said side frame members together at their forward ends in such a manner as to permit said side frame members to be advanced towards the mine face independently of each other, including a separate guide rail slidably connected with each of said side frame members adjacent the forward end thereof, and forming a means for guiding the scraper for movement across the working place.

7. In a head frame for guiding a scraper for picking up loose material from the working place of a mine, two spaced side frame members, each of said side frame members having a guide rail extending therealong, and means connecting said side frame members together at their forward ends and permitting said side frame members to be advanced towards the working place independently of each other, and forming a means for guiding the scraper for movement across the working place, said connecting means including a separate guide rail slidably connected to the forward end of each of said first mentioned guide rails and forming continuations of said first mentioned guide rails, to guide the scraper for movement into and across and away from the working place, and means detachably connecting said rails together.

8. In a head frame for guiding a scraper for picking up loose material from the working place of a mine, two spaced side frame members, each of said side frame members having a guide rail extending therealong for guiding the scraper for movement along opposite ribs of the working place, said guide rails each having inwardly curved forward and rear ends for guiding the scraper into and away from said rails, and means adjustably connecting said rails together at their forward ends and permitting said side frame members to be advanced towards the mine face independently of each other and forming a guide means for guiding the scraper across the working place in all positions of said side frame members with respect to each other including a separate guide rail connected to and forming a continuation of the curved forward end of each of said first mentioned rails.

9. In a head frame for guiding a scraper for picking up loose material from the working place of a mine, two spaced side frame members, each of said side frame members having a guide rail extending therealong for guiding the scraper for movement along opposite ribs of the working place, said guide rails each having inwardly curved forward and rear ends for guiding the scraper into and away from said rails, and means adjustably connecting said rails together at their forward ends and permitting said side frame members to be advanced towards the mine face independently of each other and forming a guide means for guiding the scraper across the working place in all positions of said side frame members with respect to each other including a separate guide rail having slidable and pivotal connection with the curved forward end of each of said first mentioned rails, and means for connecting said guide rails together at their inner ends, to form a continuous guide for the scraper from one of said side frame members to the other.

10. In a head frame for guiding a scraper to pick up loose material from the working place of a mine, two laterally spaced side frame members for guiding the scraper for movement along opposite ribs of the working place, guide means for the scraper connecting said side frame members together at their forward ends in such a manner as to permit said side frame members to be advanced independently of each other, and said side frame members each including a scraper guide extending therealong, a base, means for holding said base in a stationary position on the ground, and means connected between said base and said scraper guide for moving said side frame members relative to said base.

11. In a head frame for guiding a scraper to pick up loose material from the working place of a mine, two laterally spaced side frame members for guiding the scraper for movement along opposite ribs of the working place, guide means for the scraper connecting said side frame members together at their forward ends in such a manner as to permit said side frame members to be advanced independently of each other, and said side frame members each including a scraper guide extending along the outer side thereof, a base, means for holding said base in a stationary position on the ground, a movable base forming a support for said scraper guide, means for holding said movable base in a stationary position on the ground during the loading operation, and power operated means connected between said stationary base and said scraper guide for moving said scraper guide relative to said stationary base.

12. In a scraper loader apparatus, a scraper, head and tail ropes connected with opposite ends of said scraper for propelling the same, two laterally spaced side frame members for guiding said scraper towards and from a working face, guide means for said scraper adjustably connecting the forward ends of said side frame members together and for guiding said scraper for picking up loose material from a working place of a mine, said guide means being connected with said side frame members in such a manner as to permit said side frame members to be advanced independently of each other, to vary the angle of travel of said scraper with respect to the working place, means for holding said side frame members in a stationary position during the loading operation, and means for advancing said side frame members by power independently of each other to advance said scraper into the working place.

13. In a scraper loader apparatus, a scraper, head and tail ropes connected with opposite ends of said scraper for propelling the same, two laterally spaced side frame members for guiding said scraper towards and from a working face, guide means for said scraper adjustably connecting the forward ends of said side frame members together and for guiding said scraper for picking up loose material from a working place of a mine, said guide means being slidably connected with said side frame members to permit said side frame members to be advanced independently of each other, to vary the angle of travel of said scraper with respect to the working place, each of said side frame members including a stationary base, means for holding said base in position on the ground, a movable base, means for holding said movable base in position on the ground during the loading operation, and power means connected between said stationary base and said side frame member for moving said side frame member and movable base relative to said stationary base, to advance said respective side frame member and the scraper into the material it is desired to load.

14. In a scraper loader apparatus, a scraper, head and tail ropes connected with opposite ends of said scraper for propelling the same, two laterally spaced side frame members for guiding said scraper towards and from a working face, guide means for said scraper adjustably connecting the forward ends of said side frame members together and for guiding said scraper for picking up loose material from a working place of a mine, said guide means being slidably connected with said side frame members to permit said side frame members to be advanced independently of each other, to vary the angle of travel of said scraper along the working place, each of said side frame members including a stationary base, a jack adapted to be interposed between said base and the mine roof for holding said base in position on the ground, a movable base, a jack adapted to be interposed between said movable base and the mine roof for holding said movable base in position on the ground during the loading operation, power means connected between said stationary base and said side frame member for moving said side frame member and movable base relative to said stationary base, scraper guide means extending along the outer side of said movable base and supported thereby and having curved forward ends to turn said scraper to travel along said guide means which connects said side frame members together, and guide sheaves for said head and said tail ropes mounted on said movable base.

15. In a scraper loader apparatus, a scraper, head and tail ropes connected with opposite ends of said scraper for propelling the same, two laterally spaced side frame members for guiding said scraper towards and from a working face, guide means for said scraper adjustably connecting the forward ends of said side frame members together for guiding said scraper for movement along a working place, for picking up loose material therefrom, said guide means being slidably connected with said side frame members to permit said side frame members to be advanced independently of each other, to vary the angle of travel of said scraper along the working place, each of said side frame members including a stationary base, a jack adapted to be interposed between said base and the mine roof for holding said base in position on the ground, a plurality of longitudinally spaced movable bases, a separate jack adapted to be interposed between each of said movable bases and the mine roof for holding said bases in position on the ground during the loading operation, and a guide rail for connecting said movable bases together and formed at its forward end to turn the scoop to said guide means which connects said side frame members together.

16. In a scraper loader apparatus, a scraper, head and tail ropes connected with opposite ends of said scraper for propelling the same, two laterally spaced side frame members for guiding said scraper towards and from a working face, guide means for said scraper adjustably connecting the forward ends of said side frame members together for guiding said scraper for movement along a working place for picking up loose material therefrom, said guide means being slidably connected with said side frame members to permit said side frame members to be advanced independently of each other to vary the angle of travel of said scraper along the working place, each of said side frame members including a stationary base, a jack adapted to be interposed between said base and the mine roof for holding said base in position on the ground, a plurality of longitudinally spaced movable bases, a separate jack adapted to be interposed between each of said bases and the mine roof for holding said movable bases in position on the ground during the loading operation, a guide rail for connecting said movable bases together and formed at its forward end to turn the scoop to said guide means which connects said side frame members together, and guide sheaves for said head and said tail ropes mounted on said movable bases, adjacent the ground.

TIMOTHY F. McCARTHY.